(12) United States Patent
Hatanaka et al.

(10) Patent No.: US 7,285,952 B1
(45) Date of Patent: Oct. 23, 2007

(54) ROTATION ANGLE DETECTING DEVICE

(75) Inventors: Shinji Hatanaka, Okazaki (JP); Kenji Takeda, Okazaki (JP); Shigetoshi Fukaya, Toyota (JP)

(73) Assignees: DENSO CORPORATION, Kariya, Aichi-pref. (JP); Nippon Soken, Inc., Nishio, Aichi-pref. (JP)

( * ) Notice: Subject to any disclaimer, the term of this patent is extended or adjusted under 35 U.S.C. 154(b) by 0 days.

(21) Appl. No.: 11/707,158

(22) Filed: Feb. 16, 2007

(30) Foreign Application Priority Data

Feb. 23, 2006 (JP) ............................ 2006-047042
May 15, 2006 (JP) ............................ 2006-135351

(51) Int. Cl.
*G01B 7/30* (2006.01)
(52) U.S. Cl. ............................ 324/207.25; 73/514.31; 73/514.39
(58) Field of Classification Search ........... 324/207.25, 324/173–174, 207.2, 251; 73/514.31, 514.39
See application file for complete search history.

(56) References Cited

U.S. PATENT DOCUMENTS

| | | | |
|---|---|---|---|
| 6,630,823 B2 | 10/2003 | Tateishi et al. | |
| 6,861,837 B1 | 3/2005 | Shimizu et al. | |
| 6,894,487 B2 | 5/2005 | Kunz-Vizenetz | |

*Primary Examiner*—Bot LeDynh
(74) *Attorney, Agent, or Firm*—Nixon & Vanderhye P.C.

(57) ABSTRACT

A rotation angle detecting device is rotated by a rotating object via a gear mechanism to detect a rotation angle of the rotating object. The rotation angle detecting device includes a housing, a magnet rotor unit having a permanent magnet and a central hole, a magnetic sensor unit including a pair of magnetic sensor elements each of which detects magnetic flux density of a magnetic field generated by the permanent magnet in a direction different from the other, and a signal processor that calculates a rotation angle of the rotating object from the magnetic flux density. The magnet rotor unit includes a mechanism for changing the magnetic flux density as the number of turns of the magnet rotor unit changes.

27 Claims, 7 Drawing Sheets

ROTATION ANGLE DETECTING DEVICE

CROSS REFERENCE TO RELATED APPLICATION

The present application is based on and claims priority from Japanese Patent Applications 2006-47042, filed Feb. 23, 2006 and 2006-135351, filed May 15, 2006, the contents of which are incorporated herein by reference.

BACKGROUND OF THE INVENTION

1. Field of the Invention

The present invention relates to a rotation angle detecting device that detects the rotation angle of a rotary shaft of a rotating object, such as a steering wheel of a vehicle, by detecting change of magnetic flux density.

2. Description of the Related Art

JP-A-2005-3625 or U.S. Pat. No. 6,861,837 B1, which is a counterpart of the former, discloses a prior art rotation angle detecting device that detects a rotation angle of a rotating object larger than 360 degrees in angle. As shown in FIG. 14 of this application, the prior art rotation angle detecting device includes a pair of permanent magnets 80, 90 each of which is separately linked with a rotary shaft 40 of a rotating object via gear mechanism and a pair of magnetic sensors 100, 110, each of which detects magnetic flux density of a magnetic field generated by the permanent magnets 80, 90. The gear mechanism is comprised of three gears: a drive gear 70 that is fixed to the rotary shaft of the rotating object and two driven gears 50, 60 to which the permanent magnets 80, 90 are respectively fixed. The number of teeth of the driven gear 50 is different from the other driven gear 60 to change the phase between the output signals of the magnetic sensors 100, 110 as the driven gears 50, 60 rotate so that the rotation angle larger than 360 degrees in angle can be calculated from the phase difference. In other words, the gear mechanism includes at least three gears (70, 80, 90), which increase the size and parts of the rotation angle detecting device.

SUMMARY OF THE INVENTION

Therefore, an object of the invention is to provide a more compact rotation angle detecting device.

According to a feature of the invention, a rotation angle detecting device rotated by rotating object via a gear mechanism to detect a rotation angle of the rotating object includes a magnet rotor unit having a permanent magnet and a central hole, a magnetic sensor unit that is disposed in the inside hall and includes a pair of magnetic sensor elements each of which detects magnetic flux density Bx, By of a magnetic field generated by the permanent magnet in a direction different from the other, and a signal processor for calculating a rotation angle of the rotating object from the magnetic flux density. Further, the magnetic rotor unit includes a mechanism for changing the magnetic flux density as the number of turns of the magnet rotor unit changes.

In the above rotation angle detecting device, there are the following features:

(1) the signal processor calculates the rotation angle of the rotating object from the magnetic flux density and data of a vector length of the magnetic flux density relative to the number of turns of the magnet rotor unit;

(2) the signal processor calculates the rotation angle of the rotating object in the following steps: calculating a rotation angle of the magnetic rotor unit from arctan By/Bx; calculating the rotation angle of the rotating object from the rotation angle of the magnet rotor unit and the data of the vector length;

(3) the permanent magnet has a conical inside surface that surrounds the magnetic sensor unit;

(4) the mechanism for changing the magnetic flux density changes position of the permanent magnet relative to the magnetic sensor unit as the magnet rotor unit rotates;

(5) the mechanism for changing the magnetic flux density includes a pair of screw member disposed between a portion of the magnetic rotor unit and the magnetic sensor to change the magnetic flux density as the rotor unit rotates relative to the housing;

(6) the permanent magnet is polarized in a direction perpendicular to the rotation axis of the permanent magnet;

(7) a gear mechanism is disposed between the rotating object and the magnet rotor unit to transmit rotation of the rotating object to the magnet rotor unit;

(8) the pair of the magnetic sensor elements is disposed in a chip to be perpendicular to each other;

(9) the magnetic sensor unit is integrated into the signal processor; and

(10) the magnet rotor unit further includes a magnetic yoke disposed around the permanent magnet.

According to another feature of the invention, the signal processor calculates the rotation angle of the rotating object from the magnetic flux density Bx, By and data of a vector length of the magnetic flux density relative to the number of turns of the magnet rotor unit.

The yoke may include a cup-shaped member that has a disk portion at the bottom thereof, and the disk portion has a depression formed on the side of the disk portion 3a facing the permanent magnet. The depression may be a cylindrical space that has an outside diameter larger than the smallest diameter of the conical hole of the permanent magnet and smaller than the outside diameter of the permanent magnet. A holding member may be fixed to the housing to hold the outer periphery of the teeth that are formed on the magnetic yoke. A pair of screw member may be disposed between the magnetic yoke and the holding member to move the magnetic yoke relative to the magnetic sensor unit as the rotor unit rotates relative to the housing.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

Figure 1A:
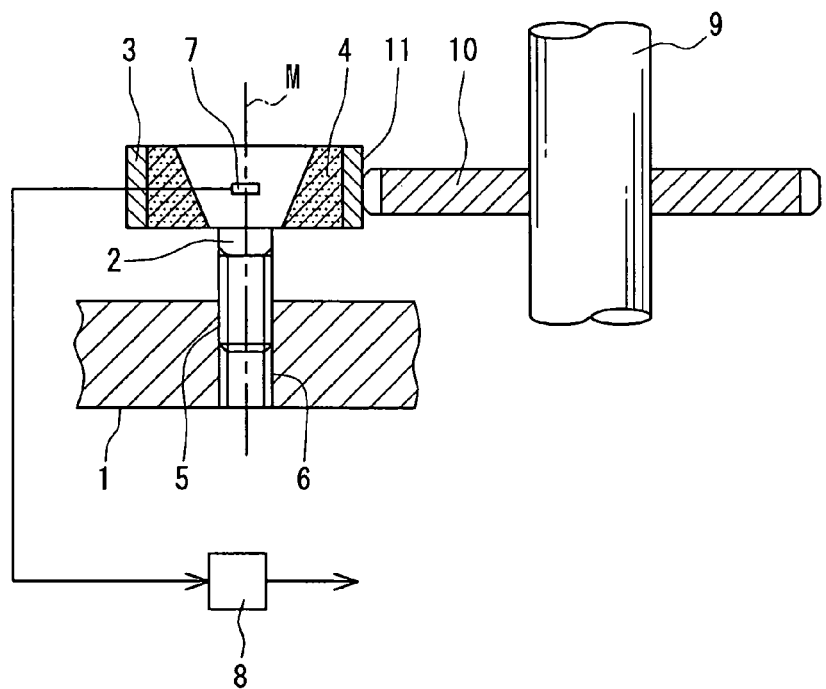
FIGS. 1A and 1B are, respectively, a schematic cross-sectional longitudinal view and a schematic plan view of a steering angle detecting device according to the first embodiment of the invention.

Several preferred embodiments of the invention will be described with reference to the appended drawings.

A vehicle steering angle detecting device according to the first embodiment of the invention will be described with reference to FIGS. 1A, 1B-4.

The vehicle steering angle detecting device is a device that detects the rotation angle of the rotary shaft 9 of a vehicle steering wheel (not shown). The vehicle steering angle detecting device includes a housing 1, a magnet rotor shaft 2, a cylindrical magnetic yoke 3 made of a soft iron, a cylindrical permanent magnet 4, a male screw 5, a female screw 6, a magnetic sensor unit 7, a signal processor 8, a spur gear 10, a gear teeth 11, etc.

The magnet rotor shaft 2, the magnetic yoke 3, the permanent magnet 4, the male screw 5 and the teeth 11 form a magnet rotor unit. The cylindrical magnetic yoke 3 is fixed to the magnet rotor shaft 2 to increase the magnetic flux density generated by the permanent magnet 4, which is held by the inner wall of the yoke 3. The cylindrical permanent magnet 4 has a center hole that is defined by a conical surface whose inside diameter increases as the surface goes upward as shown in FIG. 1A.

Figure 1B:
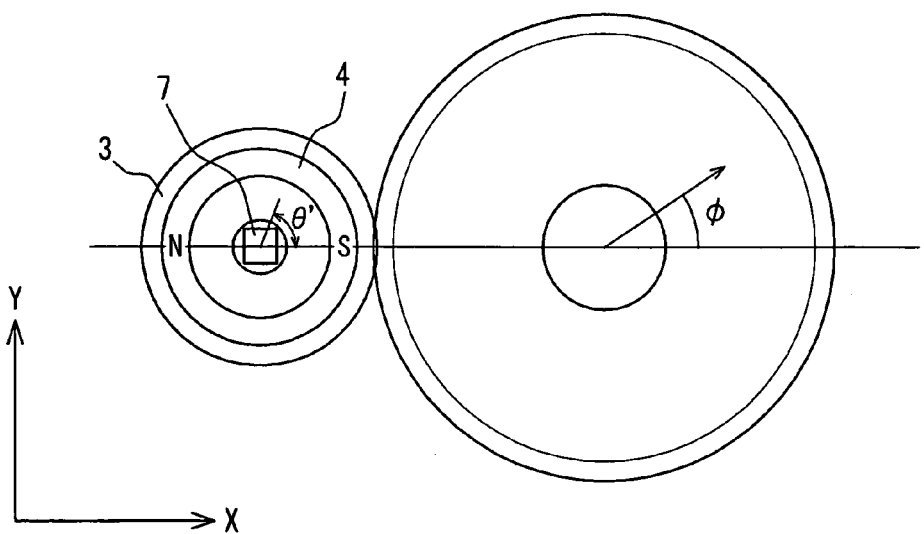

As shown in FIG. 1B, the permanent magnet 4 is polarized to have N and S poles in a direction in parallel with X axis that is perpendicular to a vertical center line M of the magnet rotor shaft 2. The male screw 5 is formed on the surface of the magnet rotor shaft 2. The female screw 6 is formed in the housing 1 to receive the male screw 5 so that the male screw 5 can move up or down by 0.5 mm as the magnet rotor shaft 2 rotates a half turn (180 degrees in angle) in one direction or the other. A spring member may be disposed between the housing 1 and the magnet rotor shaft 2 or the yoke 3 to eliminate an excessive engagement play.

The magnetic sensor unit 7 is disposed at the central hole of the permanent magnet 4 on the vertical center line M of the magnet rotor shaft 2. The magnetic sensor unit 7 is comprised of an integrated circuit (IC) chip that includes a pair of Hall elements (i.e. magnetic sensor elements) and related peripheral circuits. One of the Hall elements outputs a voltage signal Vx that is proportional to an X axis component Bx of the magnetic flux density B of the magnetic field generated by the permanent magnet 4, and the other Hall element outputs a voltage signal Vy that is proportional to a Y axis component By of the magnetic flux density B.

The magnet rotor unit is disposed so that its center axis M can be in parallel with the rotating axis of the spur gear 10, and the gear teeth 11 are formed on the outer surface of the yoke 3 so as to mesh with the spur gear 10, In this case, the ratio of the number of gear teeth 11 to the spur gear is 1/2.

Figure 4:
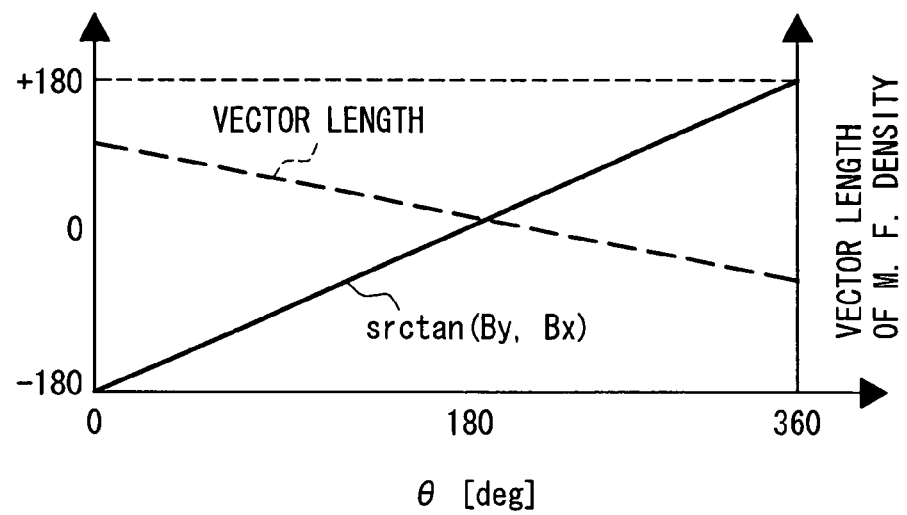
FIG. 4 is a graph showing relation between the rotation angle $\theta$ of a permanent magnet and vector length of magnetic flux density.

When the magnet rotor unit rotates in one direction, it moves downward. Accordingly, the distance between the conical surface of the permanent magnet 4 and the magnetic sensor unit 7 increases, and the magnetic flux density B decreases, as shown in FIG. 4 by a broken line. On the other hand, the magnet rotor unit moves upward when it rotates in the other direction. In this case, the magnetic flux density B increases.

Assuming that the magnitude or vector length of the flux density B is f ($\theta$) when the rotation angle of the permanent magnet 4 relative to the X axis is $\theta$, the X axis component Bx and the Y-axis component By are expressed as follows.

$$Bx = f(\theta) \cdot \cos \theta \quad (1)$$

$$By = f(\theta) \cdot \sin \theta \quad (2)$$

The vector length f ($\theta$) changes as the size, shape or material of the permanent magnet 4 or magnetic yoke 3 changes.

The signal processor 8 calculates the rotation angle $\theta$ within 360 degrees from the flux density components Bx, By the following expression.

$$\theta = \arctan (By/Bx) \quad (3)$$

Then, the signal processor 8 calculates the vector length of B at an angle $\theta$ by the following expression.

$$f(\theta) = (Bx^2 + By^2)^{1/2} \quad (4)$$

The vector length f ($\theta$) that corresponds to plural rotation angles of the permanent magnet beyond the range 360 degrees, are thus calculated and stored in a map that is included in the signal processor 8.

Figure 2:
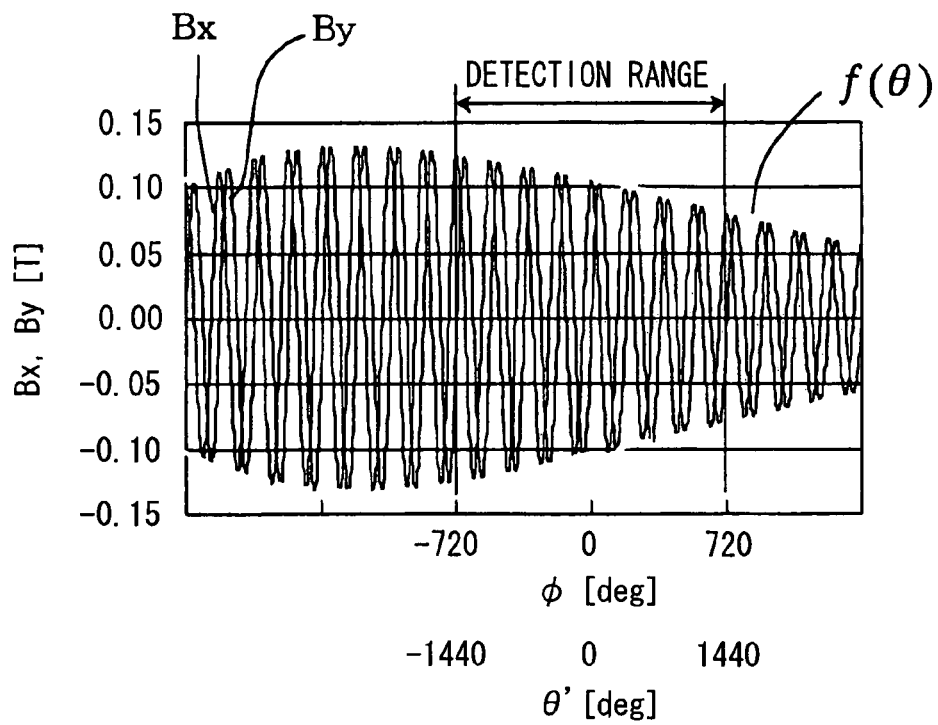
FIG. 2 is a graph showing a relation between the rotation angle $\phi$ of a steering wheel shaft and magnetic flux densities Bx, By along X, Y axes.
Figure 3:
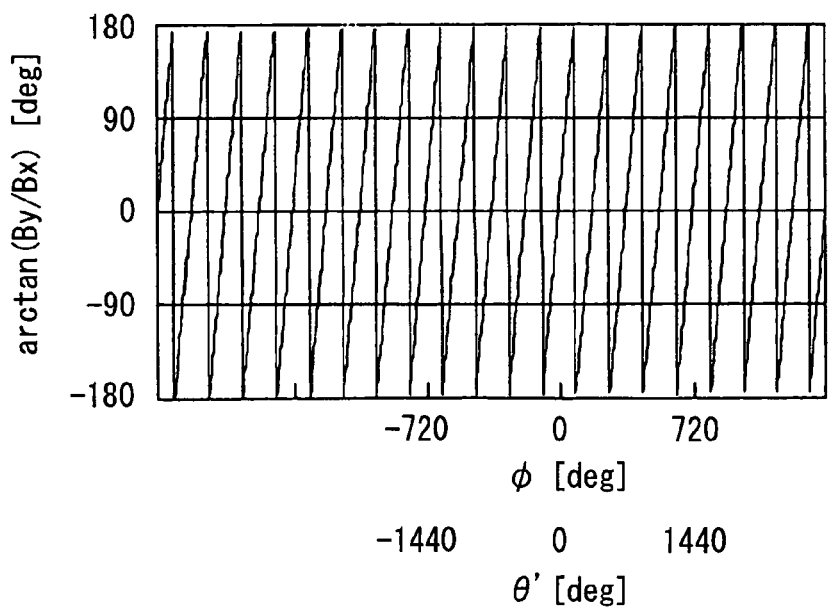
FIG. 3 is a graph showing a relation between the rotation angle of the steering wheel shaft and arctangent of By/Bx.

FIG. 2 is a graph showing the relation between the magnetic flux densities Bx, By and the rotation angle $\theta'$ of the permanent magnet 4 or the rotation angle $\phi$ of the rotary shaft 9, and FIG. 3 is a graph showing the relation between the value of arctan (By/Bx) and the rotation angle $\theta'$ of the permanent magnet 4 or the rotation angle $\phi$ of the rotary shaft 9.

The number of times of the rotation can be calculated from the vector length f ($\theta$) and the rotation angle $\theta$ (within 360 degrees) is calculated from the expression (3). Assuming that the number of times of the rotation is "2" and that the calculated rotation angle $\theta$ is "55", the actual rotation angle $\theta'$ (larger than 360 degrees) is 360 degrees+55 degrees=415 degrees.

Thus, the actual rotation angle $\theta'$ larger than 360 degrees in angle can be calculated.

In this embodiment, the magnetic flux density Bx, By can be detected by demodulating the wave form shown in FIG. 3 while the rotary shaft 9 is rotating. The cylindrical magnetic yoke 3 or the cylindrical permanent magnet 4 can be replaced with a magnetic yoke or permanent magnet having an elliptic or a polygonal cross-section. The rotation angle θ of the permanent magnet 4 that is smaller than 360 degrees can be also calculated from the characteristic curve of the vector length in addition to the characteristic curve of arctan (By/Bx), as shown in FIG. 4.

As a variation, the male and female screws 5, 6 of the first embodiment can be omitted by changing the teeth of the spur gear 10 and the gear teeth 11 to a pair of gears (such as spiral gears) that moves the permanent magnet 4 vertically at a prescribed degree when the rotary shaft 9 rotates. Instead of the gear teeth 11 being directly formed on the outer surface of the magnetic yoke 3, a ring member on which the gear teeth 11 are formed can be fixed to the outer surface of the magnetic yoke 3. The magnetic yoke 3 can be omitted by forming the gear teeth 11 on the outer surface of the permanent magnet 4 if an outside magnetic noise is negligible. Further, the spur gear 10 may be a non-backlash gear that is constituted of a pair of gears connected by a spring member to prevent a back lash. The conical surface of the center hole of the permanent magnet 4 can be modified to a stepped inclined surface whose inside diameter increases stepwise as the surface goes upward. The distance between the surface of the permanent magnet 4 and the magnetic sensor unit 7 increases stepwise when the magnet rotor turns over 360 degrees, and the magnetic flux density B decreases stepwise.

A rotation angle detecting device according to the second embodiment of the invention will be described with reference to FIG. 5. Incidentally, the same reference numeral as the first embodiment represents the same or substantially the same part, portion or component as the first or a precedent embodiment, hereafter.

Figure 5:
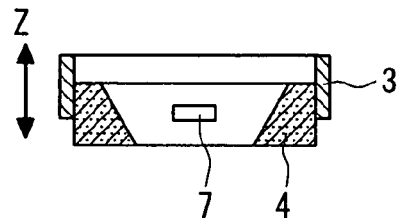
FIG. 5 is a cross-sectional view of a rotation angle detecting device according to the second embodiment of the invention.

The teeth of the gear 10 and the teeth 11 are formed spiral as the above variation of the first embodiment, and are arranged so that only the magnetic yoke 3 can be moved upward or downward along the outer surface of the permanent magnet 4, as shown in FIG. 5. As the magnetic yoke 3 is moved upward or downward by the gear 10 (shown in FIG. 1), the vector length of the magnetic flux density changes in substantially the same manner as the first embodiment. The center hole of the permanent magnet may be cylindrical instead of conical.

Figure 6:
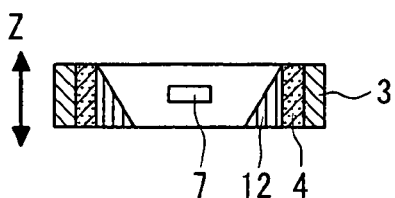
FIG. 6 is a cross-sectional view of a rotation angle detecting device according to the third embodiment of the invention.

A rotation angle detecting device according to the third embodiment of the invention will be described with reference to FIG. 6.

Instead of the permanent magnet 4 having the conical surface, a permanent magnet 4 having a cylindrical surface and a second magnetic yoke 12 having a conical inner surface are combined in this embodiment. The second magnetic yoke 12 is fitted to the cylindrical inner surface of the permanent magnet 4. It is easy to provide a suitable inner surface of the second yoke 12, so that more suitable vector length f (θ) can be provided by machining the second yoke 12.

Figure 7:
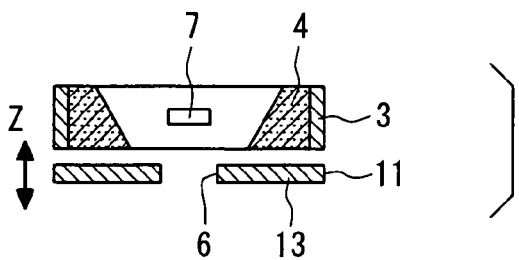
FIG. 7 is a cross-sectional view of a rotation angle detecting device according to the fourth embodiment of the invention.

A rotation, angle detecting device according to the fourth embodiment of the invention will be described with reference to FIG. 7.

This rotation angle detecting device includes a magnetic disk 13 in addition to the housing 1, the magnet rotor shaft 2, the cylindrical magnetic yoke 3, the cylindrical permanent magnet 4, the male screw 5, the female screw 6, the magnetic sensor unit 7, the signal processor 8, the spur gear 10 and the a gear teeth 11 of the first embodiment. However, the gear teeth 11 and the female screw 6 are respectively formed on the peripheral surface and the center hole of the magnetic disk 13 so that only the magnetic disk 13 can be driven by the screw 5 in the vertical direction and rotated by the spur gear 10 as the rotary shaft 9 rotates.

As the magnetic disk 13 is moved upward or downward, the vector length f (θ) or the vector length of the magnetic flux density changes in substantially the same manner as the first embodiment. The center hole of the permanent magnet may be also cylindrical instead of conical.

Figure 8:
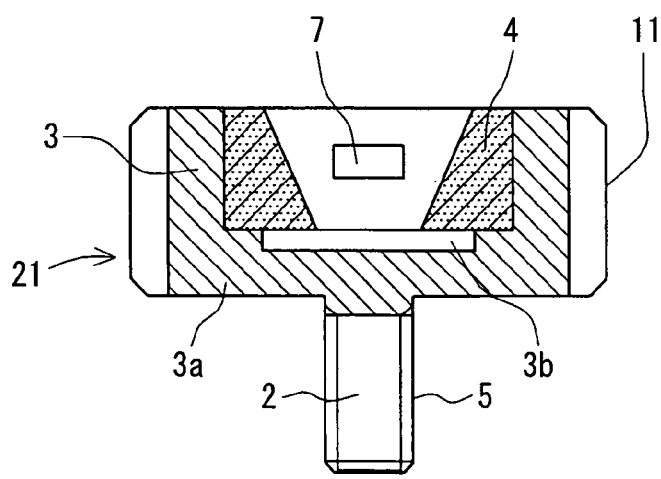
FIG. 8 is a cross-sectional view of a rotation angle detecting device according to the fifth embodiment of the invention.

A rotation angle detecting device according to the fifth embodiment of the invention will be described with reference to FIGS. 8-10.

The magnet rotor shaft 2, the magnetic yoke 3, the permanent magnet 4, the male screw 5 and the teeth 11 form a unitary magnet rotor unit 21. The magnetic yoke 3 is a cup-shaped member that has a disk portion 3a at the bottom thereof. The permanent magnet 4 is fitted to the inside surface of the magnetic yoke 3. A cylindrical depression 3b is formed on the side of the disk portion 3a facing the permanent magnet 4. The cylindrical depression 3b has an outside diameter that is larger than the smallest diameter of the conical hole of the permanent magnet 4 and smaller than the outside diameter of the permanent magnet 4. The outside diameter of the depression 3b is preferably as large as the arithmetical means of the outside diameter of the permanent magnet 4 and the smallest diameter of the conical hole of the permanent magnet 4, and the depth is designed to provide a suitable magnetic flux density.

Figure 9:
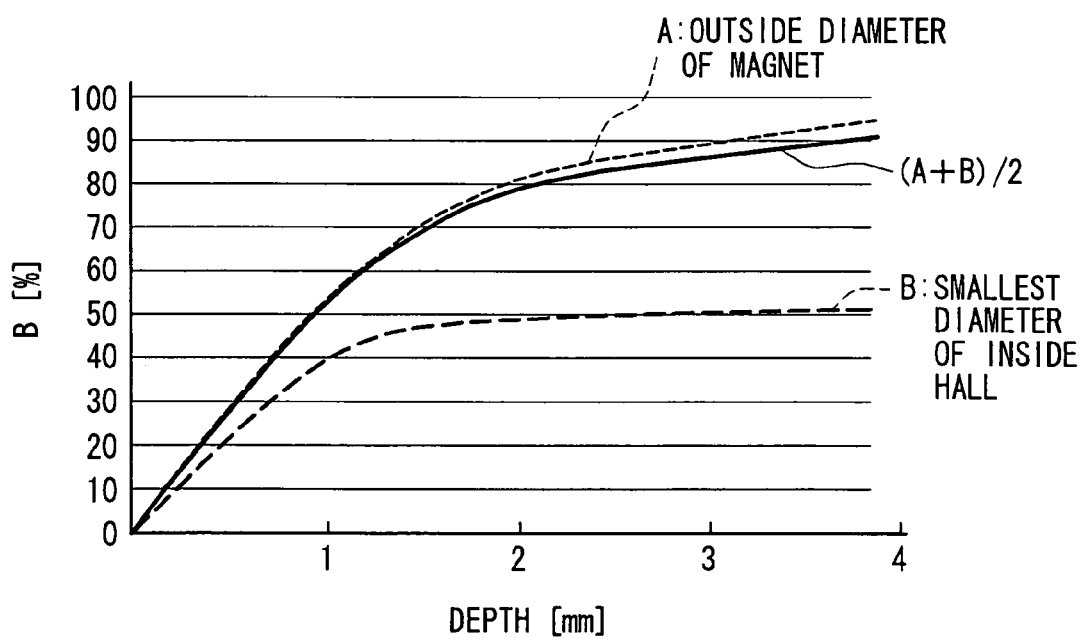
FIG. 9 is a graph showing a relation between the depth of a bottom gap of the seventh embodiment and magnetic flux density to be detected by the magnetic sensor thereof.
Figure 10:
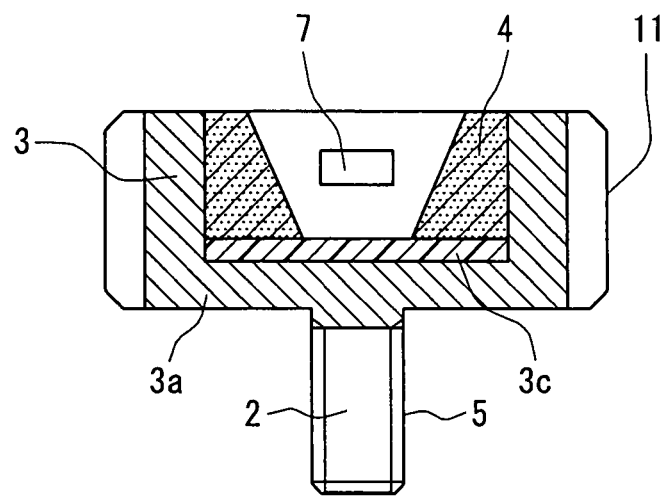
FIG. 10 is a cross-sectional view of a variation of the rotation angle detecting device according to the fifth embodiment.

As shown in FIG. 9, the ratio (%) of the magnetic flux density B measured at the portion to the corresponding portion of the first embodiment changes as the diameter of the depression 3b and the depth thereof change. The depth is usually between 1 mm and 10 mm and, preferably, larger than 2 mm. The shape of the depression 3b may be other than cylindrical, such as rectangular, conical or elliptical shape. As shown in FIG. 10, the depression 3b may be filled with a non-magnetic member 3c.

Figure 11A:
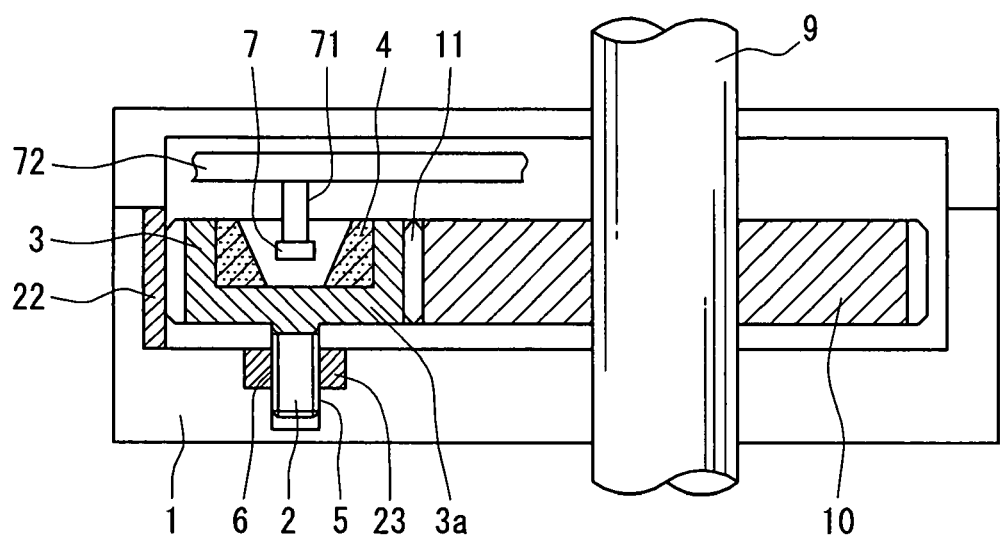
FIGS. 11A and 11B are, respectively, a plan view and a cross-sectional view of a rotation angle detecting device according to the sixth embodiment of the invention.
Figure 11B:
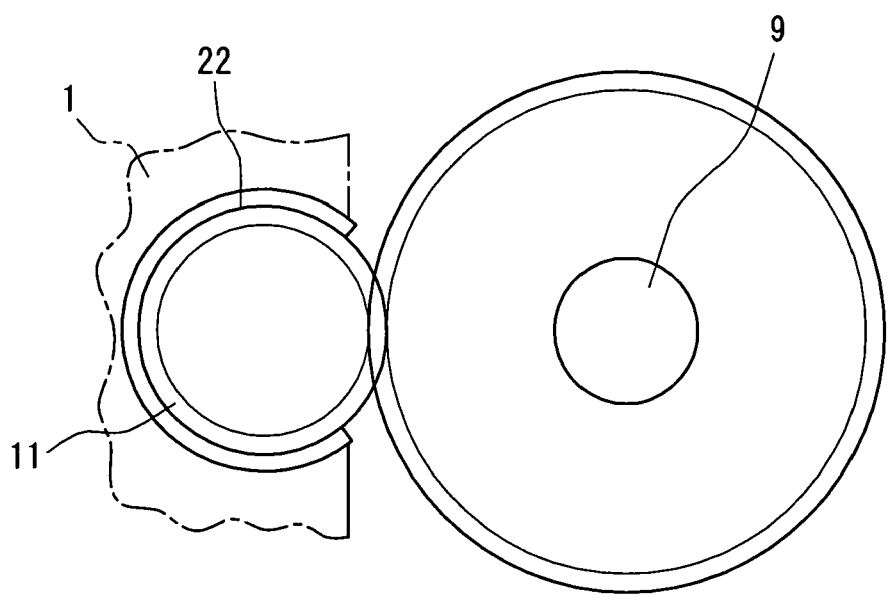

A rotation angle detecting device according to the sixth embodiment of the invention will be described with reference to FIGS. 11A and 11B.

The housing 1 has a semi-cylindrical sleeve 22 that holds the outer periphery of the teeth 11 and an insert member 23 that has the female screw 6. The sleeve 22 has an arc-shaped opening of about a quarter length of the whole circumference of the sleeve 22, from which the teeth 11 of the magnetic yoke 3 projects to mesh with the gear 10. The female screw 6 of the insert member 23 slidably receives the male screw 5 formed on the outer periphery of the magnet rotor shaft 2. The sleeve 22 may be formed separately from the case 1 or may be integrated with the case 1. The semi-cylindrical sleeve is effective to eliminate an excessive engagement play between the gear 10 and the teeth 11. The magnetic sensor unit 7 is supported via a pole member 71 by a circuit board 72.

Figure 12:
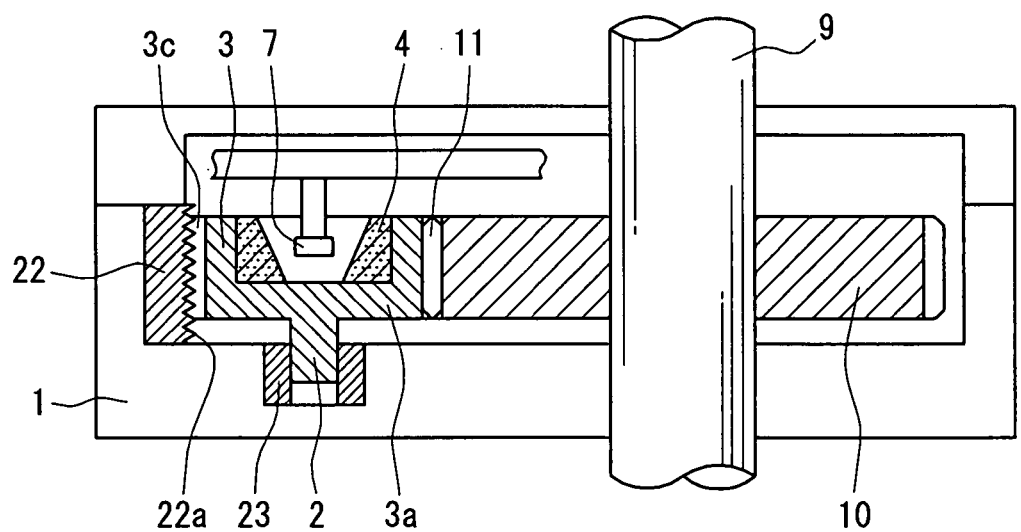
FIG. 12 is a cross-sectional view of a rotation angle detecting device according to the seventh embodiment of the invention.
Figure 13:
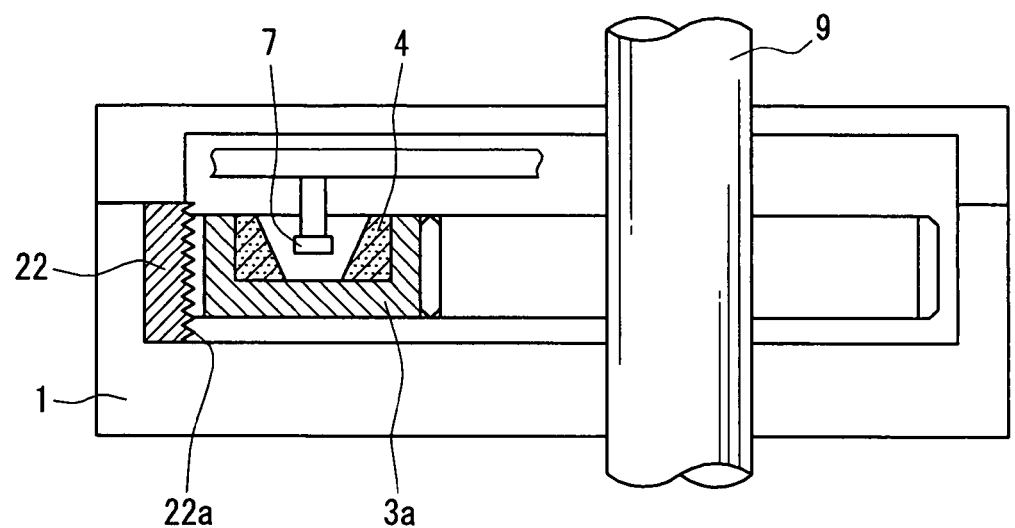
FIG. 13 is a cross-sectional view of a variation of the rotation angle detecting device according to the seventh embodiment.
Figure 14:
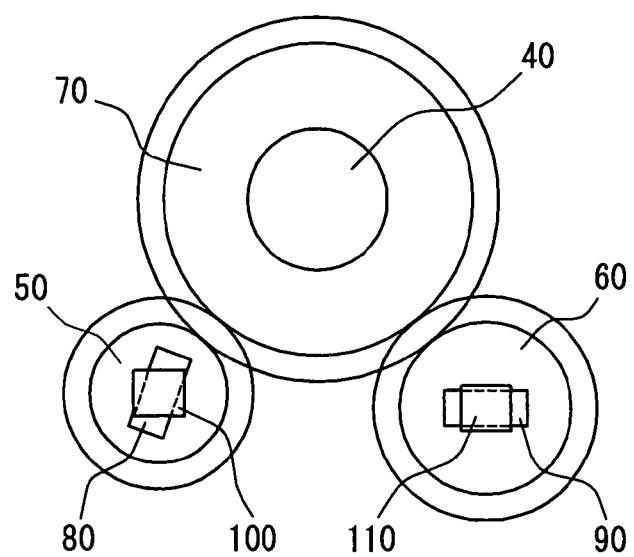
FIG. 14 is a schematic diagram of a prior art rotation angle detecting device.

A rotation angle detecting device according to the seventh embodiment of the invention will be described with reference to FIGS. 12 and 13.

A male screw 3c is formed at the teeth 11 on the outer periphery of the magnetic yoke 3 instead of the male screw 5 formed on the magnet rotor shaft 2, and a female screw 22a is formed on the inner periphery of the semi-cylindrical sleeve 22 instead of the female screw 6 formed in the insert member 23. The insert member 23 supports the magnet rotor shaft 2 as a bearing so that the magnet rotor shaft 2 can rotate and also vertically slide therein. As a variation, the magnet rotor shaft 2 and the insert member 23 can be omitted as shown in FIG. 13.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A rotation angle detecting device rotated by rotating object via a gear mechanism to detect a rotation angle φ of the rotating object comprising:
   a housing;
   a magnet rotor unit having a permanent magnet and a central hole, said rotor unit is rotatably supported by the housing;
   a magnetic sensor unit including a pair of magnetic sensor elements each of which detects magnetic flux density Bx, By of a magnetic field generated by the permanent magnet in a direction different from the other, said magnetic sensor unit being supported by the housing to be disposed in the central hole to provide a pair of output signals corresponding to magnetic flux densities; and
   a signal processor for calculating a rotation angle φ of the rotating object from the magnetic flux density,
   wherein the magnetic rotor unit comprises means for changing the magnetic flux density as the number of turns of the magnet rotor unit changes.

2. A rotation angle detecting device as in claim 1, wherein the signal processor calculates the rotation angle of the rotating object from the magnetic flux density and data of a vector length of the magnetic flux density relative to the number of turns of the magnet rotor unit.

3. A rotation angle detecting device as in claim 2, wherein the signal processor calculates the rotation angle of the rotating object in the following steps:
   calculating a rotation angle of the magnetic rotor unit from arctan of a ratio of the magnetic flux densities that is By/Bx;
   calculating the rotation angle of the rotating object from the rotation angle and the data of the vector length.

4. A rotation angle detecting device as in claim 1, wherein the permanent magnet has a conical inside surface that surrounds the magnetic sensor unit.

5. A rotation angle detecting device as in claim 1, wherein the means for changing the magnetic flux density changes position of the permanent magnet relative to the magnetic sensor unit as the magnet rotor unit rotates.

6. A rotation angle detecting device as in claim 1, the means for changing the magnetic flux density comprises a pair of screw member disposed between a portion of the magnetic rotor unit and the magnetic sensor to change the magnetic flux density as the rotor unit rotates relative to the housing.

7. A rotation angle detecting device as in claim 1, the permanent magnet is polarized in a direction perpendicular to the rotation axis of the permanent magnet.

8. A rotation angle detecting device as in claim 1, further comprising a gear mechanism disposed between the rotating object and the magnet rotor unit to transmit rotation of the rotating object to the magnet rotor unit.

9. A rotation angle detecting device as in claim 1, wherein the pair of the magnetic sensor elements is disposed in a chip to be perpendicular to each other.

10. A rotation angle detecting device as in claim 1, wherein the magnetic sensor unit is integrated into the signal processor.

11. A rotation angle detecting device as in claim 1, wherein the magnet rotor unit further comprises a magnetic yoke disposed around the permanent magnet.

12. A rotation angle detecting device as in claim 11, wherein the signal processor calculates the rotation angle of the rotating object from the magnetic flux density Bx, By and data of a vector length of the magnetic flux density relative to the number of turns of the magnet rotor unit.

13. A rotation angle detecting device as in claim 12, wherein the signal processor calculates the rotation angle of the rotating object in the following steps:
   calculating a rotation angle of the magnetic rotor unit from arctan By/Bx;
   calculating the rotation angle of the rotating object from the rotation angle and the data of the vector length.

14. A rotation angle detecting device as in claim 11, wherein the means for changing the magnetic flux density changes position of the permanent magnet relative to the magnetic sensor unit as the magnet rotor unit rotates.

15. A rotation angle detecting device as in claim 14, the means for changing the magnetic flux density comprises a pair of screw member disposed between the permanent magnet and the magnetic sensor.

16. A rotation angle detecting device as in claim 11, the permanent magnet is polarized in a direction perpendicular to the rotation axis of the permanent magnet.

17. A rotation angle detecting device as in claim 11, wherein the permanent magnet has a conical hole that surrounds the magnetic sensor unit.

18. A rotation angle detecting device as in claim 11, further comprising a gear mechanism disposed between the rotating object and the magnet rotor unit.

19. A rotation angle detecting device as in claim 11, wherein the pair of the magnetic sensor elements is disposed in a chip to be perpendicular to each other.

20. A rotation angle detecting device as in claim 11, wherein the magnetic sensor unit is integrated into the signal processor.

21. A rotation angle detecting device as in claim 17, wherein:
   the yoke comprises a cup-shaped member that has a disk portion (3a) at the bottom thereof; and
   the disk portion has a depression formed on the side of the disk portion 3a facing the permanent magnet.

22. A rotation angle detecting device as in claim 21, wherein the depression is a cylindrical space that has an outside diameter larger than the smallest diameter of the conical hole of the permanent magnet and smaller than the outside diameter of the permanent magnet.

23. A rotation angle detecting device as in claim 21, further comprising a gear mechanism disposed between the rotating object and the magnet rotor unit to transmit rotation of the rotating object to the magnet rotor unit, wherein the yoke has teeth of the gear mechanism on the outer surface thereof.

24. A rotation angle detecting device as in claim 23, wherein the means for changing the magnetic flux density comprises a pair of screw member disposed between a portion of the magnetic rotor unit and the magnetic sensor unit to move the magnet rotor unit relative to the magnetic sensor unit as the rotor unit rotates relative to the housing.

25. A rotation angle detecting device as in claim 23, further comprising a holding member fixed to the housing to hold the outer periphery of the teeth.

26. A rotation angle detecting device as in claim 25, wherein the means for changing the magnetic flux density comprises a pair of screw member disposed between the magnetic yoke and the holding member to move the magnetic yoke relative to the magnetic sensor unit as the rotor unit rotates relative to the housing.

27. A rotation angle detecting device as in claim 26, wherein:

the magnet rotor unit further comprises a rotor shaft; and the housing comprises an insert member that supports the rotor shaft as a bearing so that the magnet rotor shaft can rotate and also vertically slide therein.

* * * * *